United States Patent [19]

Buchholz et al.

[11] Patent Number: 5,440,545
[45] Date of Patent: Aug. 8, 1995

[54] PACKET DELIVERY SYSTEM

[75] Inventors: Dale R. Buchholz, Palatine; William K. Doss, Lake In The Hills; R. Lee Hamilton, Jr., Palatine; Richard E. White, Cary; Karen Robbins, Lake Zurich, all of Ill.

[73] Assignee: Motorola, Inc., Schaumburg, Ill.

[21] Appl. No.: 100,403

[22] Filed: Aug. 2, 1993

[51] Int. Cl.6 .............................................. H04L 12/56
[52] U.S. Cl. ..................... 370/60; 370/94.1; 370/95.3; 371/32
[58] Field of Search ............... 370/60, 94.1, 95.3, 370/58.1, 58.2, 58.3; 371/32

[56] References Cited

U.S. PATENT DOCUMENTS

| | | | |
|---|---|---|---|
| 4,569,042 | 2/1986 | Larson | 370/13 |
| 4,755,986 | 7/1988 | Hirata | 370/60 |
| 4,774,706 | 9/1988 | Adams | 370/94 |
| 4,890,280 | 12/1989 | Hirata | 370/60 |
| 4,916,691 | 4/1990 | Goodman | 370/60 |
| 4,922,487 | 5/1990 | Eilenberger et al. | 370/60 |
| 4,951,278 | 8/1990 | Biber et al. | 370/60 |
| 4,975,952 | 12/1990 | Mabey et al. | 370/60 |
| 4,977,556 | 12/1990 | Norguchi | 370/60 |
| 5,008,878 | 7/1991 | Ahmadi et al. | 370/60 |
| 5,050,166 | 9/1991 | Cantoni et al. | 370/94.1 |
| 5,101,404 | 3/1992 | Kunimoto et al. | 370/60 |
| 5,113,392 | 5/1992 | Takiyasu et al. | 370/85.15 |
| 5,210,751 | 5/1993 | Onoe et al. | 370/94.1 |
| 5,245,616 | 9/1993 | Olson | 370/60 |

*Primary Examiner*—Douglas W. Olms
*Assistant Examiner*—Russell W. Blum
*Attorney, Agent, or Firm*—Val Jean F. Hillman

[57] ABSTRACT

A packet switching system (100) having a packet switch (140) employs an acknowledgement scheme in order assure the delivery of all fragments (310) comprising a fragmented data packet (300) to improve overall system throughput during the handling of packets (310) that require reassembly. When packet fragments (310) are lost, corrupted or otherwise unintelligible to a receiving device (92, 94), the acknowledgement scheme permits retransmission of the missing data. In addition, a second acknowledgment signal is scheduled by system processing resources (110) in order to verify the successful delivery of all retransmitted data.

5 Claims, 6 Drawing Sheets

PACKET DELIVERY SYSTEM

This patent application is related to U.S. patent application Ser. No. 07/856,276, now U.S. Pat. No. 5,396,490, filed Mar. 23, 1992 and entitled PACKET REASSEMBLY METHOD AND APPARATUS.

FIELD OF THE INVENTION

This invention is generally directed to a packet switching system in which data is transmitted by packets and is also generally directed to a method and apparatus for referencing, storing and reassembling data, segregated (fragmented) into smaller packets, back into an original configuration. This invention is more specifically directed to a method and apparatus for acknowledging delivery of said segregated (fragmented) packets.

BACKGROUND OF THE INVENTION

Packet data networks convey information from an originating device to a specified addressee by incorporating the information into packets. Each packet contains a preamble (control data) and information (message data). The preamble typically includes packet network control data, synchronization information and addressee destination information. The message information portion contains the originating device's message.

Packets containing such originating device messages are not always communicated directly to the destination addressee. As is known, these packets may be relayed by several intermediate relay stations before reaching their final destination. As the transmission speeds of packet networks increase, it becomes increasingly important for relay stations to be able to efficiently handle and process these information packets.

On occasion the information (message data) portion of a data packet originated by an originating device is too large to fit into the message data portion of packets utilized by intermediate relay stations. In such instances, the original data packet must be separated into N fragments prior to transmission to or from said intermediate station. Upon receipt by a receiving device, such as, for example, another relay station or the destination device, each of the N fragments must be reassembled in the correct order in order to recreate the original data packet.

Packet reassembly methods are known in the art. Typically such methods are processor intensive operations which require system processing resources to evaluate each fragmented packet as received by a receiving device, in order to validate correct reception, determine whether all fragments have been received, store each fragment in memory and reformulate new fragments corresponding to the received fragments, prior to reconstruction of the original data packet. While this approach is quite efficient from a packet reconstruction stand point, it is nonetheless demanding upon system processing resources which must be interrupted upon receipt of each and every fragment. In many applications, such as a wireless local area network (LAN), where system processing resources are already heavily taxed, the increased level of processor demand associated with packet reassembly may well exceed the practical limits of many of the currently available processor technologies.

An alternative method for packet reassembly which seeks to avoid the shortcomings associated with continual processor involvement is disclosed pursuant to the above cited and co-pending patent application which suggests that much of the packet reassembly process may be performed by packet reassembly hardware (e.g., gate arrays or application specific integrated circuits). According to this approach, processor intervention is typically only required upon receipt of the first and the last fragment which compose the original data packet. While this approach minimizes demand upon system processing resources, efficient packet reconstruction may suffer if and when fragmented packets become lost, corrupted or otherwise unintelligible and therefore require retransmission from the source. As will be appreciated, reduced processor involvement during packet handling may lead to inefficiencies in notifying a source device that various packets require retransmission.

It would be extremely advantageous therefore to provide an improved method for data packet acknowledgement within a packet data network which assures the delivery of all fragmented packets requiring reassembly and avoids the shortcomings set forth herein above.

DETAILED DESCRIPTION OF THE PREFERRED EMBODIMENTS

With reference to the present invention, those problems identified with the handling fragmented packets in a packet switching system are minimized, if not overcome, by the present invention which employs an acknowledgement scheme in order assure the delivery of all fragments comprising a fragmented data packet. Thus, when packet fragments are lost, corrupted or otherwise unintelligible to a receiving device, the acknowledgement scheme permits retransmission of the missing data. In addition, a second acknowledgment signal is scheduled by system processing resources in order to verify the successful delivery of all retransmitted data.

Figure 1A:
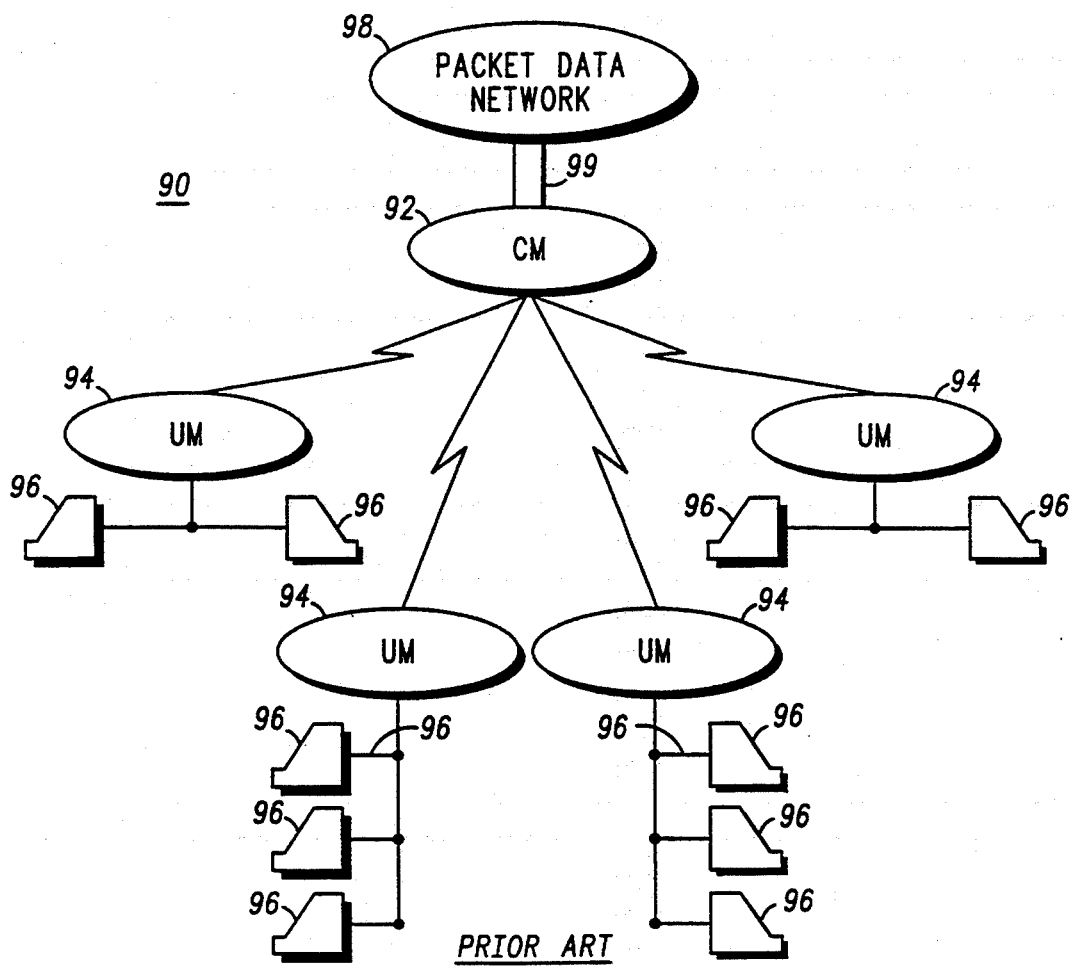
FIG. 1a illustrates a radio frequency (RF) packet transmission system in accordance with the present invention.

The present invention has application within the field of wireless and wire line packet transmission systems. FIG. 1a illustrates a radio frequency (RF) packet transmission system 90 comprising a wireless local area network (LAN) in which control module (CM) 92 utilizes RF communications to communicate with a plurality of user modules (UM) 94. In accordance with the preferred embodiment, CM 92 and UMs 94 may employ any of the well known resource allocation techniques, such as, but not limited to, Time Division Multiple Access (TDMA), Time Division Multiplexing (TDM), Carrier Sense Multiple Access (CSMA) and/or Code Division Multiple Access (CDMA). Each UM 94 is connected to one or more user devices 96 such as a data terminal, personal computer or other information input/output (I/O) device. The CM 92 is connected to packet data network 98 by data channel 99 which may include wires or optical links.

CM 92 controls communications within the illustrated network and passes information from data network 98 to user devices 96 via an associated UM 94. CM 92 also controls local communications by receiving information from one UM 94 and relaying information to a different UM 94. Data network 98 may consist of an Ethernet network, a Token Ring Network, or any of the other well known data networks. Information passed between CM 92 and UMs 94 is in the form of packets as will be discussed below.

Figure 1B:
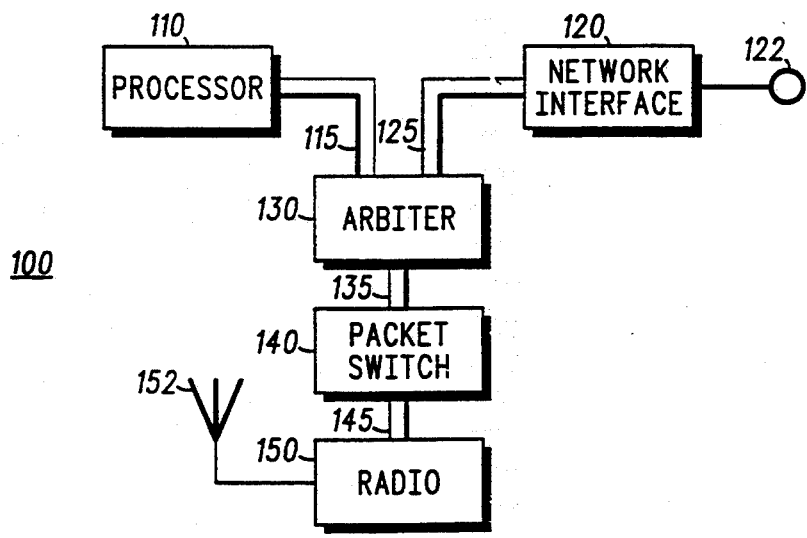
FIG. 1b is a block diagram of an exemplary packet switching system in accordance with the present invention.

FIG. 1b is a block diagram representation of a packet switching device 100 capable of originating, receiving, and relaying (transmitting) information within the packet transmission system of FIG. 1a. In accordance with the present invention, the packet switching device 100 of FIG. 1b is a preferred configuration for either a CM 92 or a UM 94. As depicted, each packet switching device 100 includes a central processor 110, network interface device 120, bus arbiter 130, packet switch 140 and a radio 150 with antenna element 152. The central processor 110 and the network interface device 120 are shown connected to the bus arbiter 130 via buses 115 and 125, respectively. In practice, the central processor 110 includes associated random access memory, read only memory, control logic and necessary control logic drivers to direct and control device 100 operation.

The network interface device 120 provides switched access to and from an external information network via terminal 122. By way of example, and not by way of limitation, assume network interface device 120 is an Ethernet network interface device for providing access to an Ethernet local area network (LAN). As will be appreciated, however, device 120 may compose any of the other well known interface devices capable of interpreting data supplied by other packet network protocols.

The packet switch 140 is connected to the processor 110 and the network interface device 120 via a communications bus 135 and a bus arbiter circuit 130. By design, the bus arbiter 130 is used to arbitrate access to the packet switch 140 from between the processor 110 and the network interface device 120, thereby facilitating data packet transfers between the packet switch 140 and either the processor 110 or the information network via the network interface device 120. Accordingly, bus arbiter 130 consists of available integrated circuit translators, registers and line drivers for selective communications with a bus plurality, shown as buses 115 and 125, seeking access to the packet switch 140. Communications buses 115, 125 and 135 may compose any of the well known bi-directional communications buses employed in the art.

A radio 150 having at least one antenna element 152 is coupled to the packet switch 140 via a packet switch bus 145 in order to communicate data to and from the various packet switching devices 100 of FIG. 1a via radio frequency (RF) channels. The physical structure of a packet switch bus 145 is known in the art and requires no further discussion at this time. The purpose of packet switch 140 is to receive and transmit packetized data among devices on the packet switch bus 145. It also communicates via communications bus 135, bus arbiter 130 and communications bus 115 with the central processor 110. While only a single radio is shown connected to the packet switch bus 145, a plurality of communication devices, suited for coupling different communications networks to the packet switch bus can be utilized. For example, devices such as a telephone, a T1 circuit, an ISDN circuit as well as other devices and networks are suitable for connection to the packet switch bus 145 and ultimately the packet switch 140.

As previously stated, when the message information portion of a data packet originated by an originating device, such as a device connected to the network interface 120, is too large to fit into a packet for transmission by radio 150, the original information must be separated into N fragments prior to RF transmission. Upon receipt, by another packet switching device (CM 92 or UM 94), the packets containing the N fragments must be validated and reassembled, prior to communication over the Ethernet network via network interface device 120 or transmission back out over a radio 150.

Figure 2:
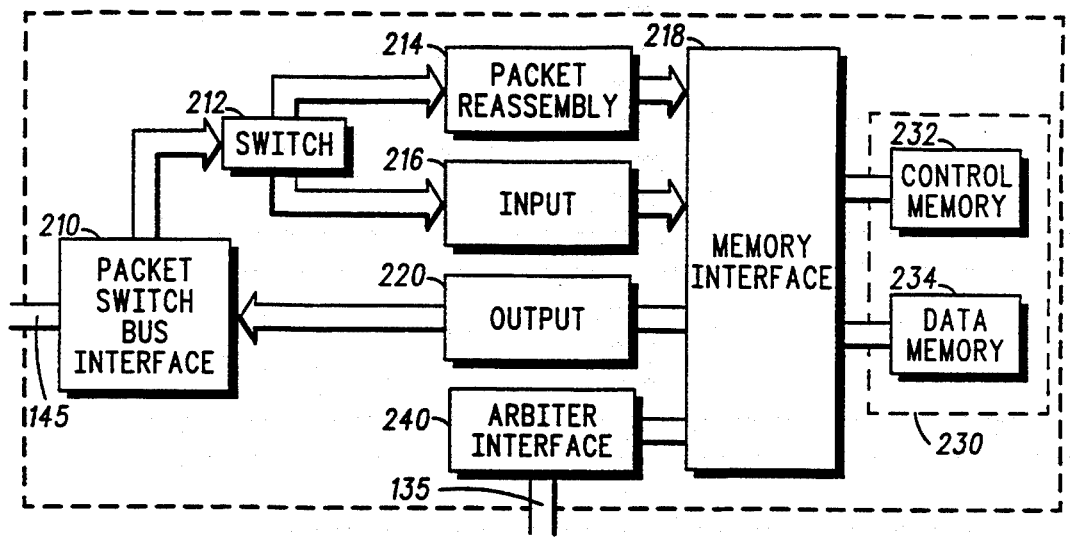
FIG. 2 is a block diagram of a packet switch as shown in FIG. 1b.

FIG. 2 is a more detailed block diagram of an exemplary packet switch 140 of the type illustrated in FIG. 1b. During operation, packets received by the packet switch 140 over the packet switch bus 145 are stored in appropriate memory locations within random access memory 230 which is partitioned into control memory 232 and data memory 234. Data memory 234 stores the information portion (message data) of a fragment, while control memory 234 contains the control structures which control the basic operation of the packet switch 140. It will be appreciated by those skilled in the art that memory partitioning can be either physical or logical.

in accordance with the present invention, a memory interface unit 218 is coupled to random access memory 230 and operates to direct the storage and retrieval of information therefrom as is known in the art. For information storage, packet switch bus 145 and the devices connected thereto are coupled to memory interface 218 via packet switch bus interface 210, switch 212 and packet reassembly hardware 214 or input control function 216. For information retrieval, packet switch bus 145 and the devices connected thereto are coupled to memory interface 218 via output control function 220 and packet switch bus interface 210. In a similar fashion, arbiter interface 240 couples the arbiter circuit 130 of FIG. 1b to memory interface 218 via bus 135. Memory interface unit 218 thus operates to direct the storage and retrieval of information as between the arbiter circuit 130 (i.e., processor 110 and network interface 120) and memory 230.

In order to improve overall system throughput and lessen the strain on central processor 110 resources, the packet switch 140 employs reassembly hardware 214 during the handling of packets that require reassembly. Input control function 216 is employed during the processing of packets which do not require reassembly. In this manner, the packet switch 140 performs packet handling and reassembly with minimal processor 110 intervention and without requiring message data duplications. By minimal processor intervention, the present invention anticipates that processor 110 involvement in the reassembly of fragmented packets will be kept to a minimum. In accordance, minimal processor intervention can be defined in terms of the extent of the processors participation in the reassembly of a fragmented data packet. The fewer steps performed by the central processor which direct reassembly activities, the less substantial the processor's intervention. In accordance with the present invention, minimal processor intervention anticipates no more than two processor interrupts during the reconstruction of a single data packet.

This approach is accomplished by utilizing a hierarchy of addressability wherein received packets requiring no reassembly are disassembled and stored in segregated memory locations under the control of the input control function 216. When, on the other hand, a packet is identified as one requiring reassembly, reassembly and storage into segregated memory locations is provided under the direction of the packet reassembly hardware 214. Thereafter, the data to be transmitted back out over the radio or over the communications network is assembled by simply addressing the segregated memory locations, without performing the intermediate step of duplicating the received transmission packet's message data.

Since various types of packet switches are known in the art, the specific operation and details of the internal functioning of the packet switch 140 will not be explained. Suffice it to say, however, that the switch 212 of packet switch 140 determines whether a received packet requires reassembly. Upon this determination, packet handling is switched to the appropriate control function (e.g. reassembly hardware 214 or input control function 216). In general, the functions of the packet switch 140 can be accomplished by a software implementation or in hardware by a state machine, application specific integrated circuit (ASIC) or gate array implementation.

Figure 3:
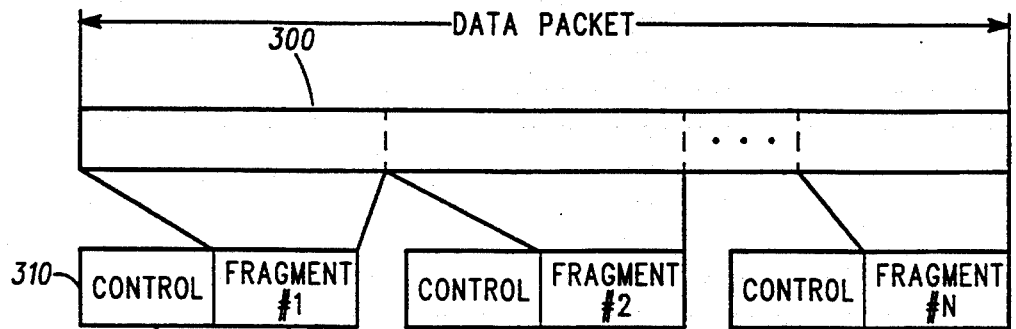
FIG. 3 illustrates the relationship between information in a data packet format and its correspondence to information contained within a transmission packet format.

FIG. 3 illustrates the relationship between information in a data packet format 300, like that employed to communicate information over the Data Packet Network 98 of FIG. 1a, and its correspondence to information in a transmission packet format 310, like that employed to communicate information over RF channels between radios 150 employed by CM 92 and UMs 94. As shown, data packet 300 comprises originating device control and message data. As previously stated, when the data packet 300 is too long to fit into a single transmission packet 310, the data packet is separated into N fragments. As shown, each fragment is formatted into a separate transmission packet 310. Each transmission packet 310 comprises control information 311 and a fragment field 312 where portions of the data packet 300 are contained. Of course, where the entire data packet 300 can be placed into a single transmission packet 310, it will be.

Figure 4:
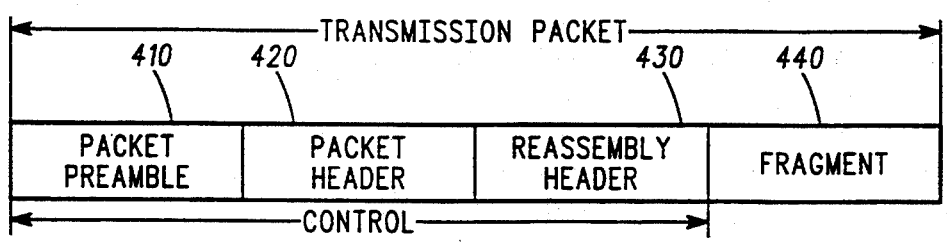
FIG. 4 illustrates information contained in the control portion of a transmission packet as shown in FIG. 3.

FIG. 4 illustrates the information contained within the control section of a transmission packet requiring reassembly, in accordance with FIG. 3. The format illustrates the transmission of packet preamble information 410, a packet header 420, a reassembly header 430 and a fragment field 440. The packet preamble 410 is provided for radio receiver 150 synchronization purposes. The packet header 420 and the reassembly header 430 will be explained in more detail below. As previously suggested, the fragment field 440 contains a portion of the data packet 300 that is to be communicated.

Figure 5:
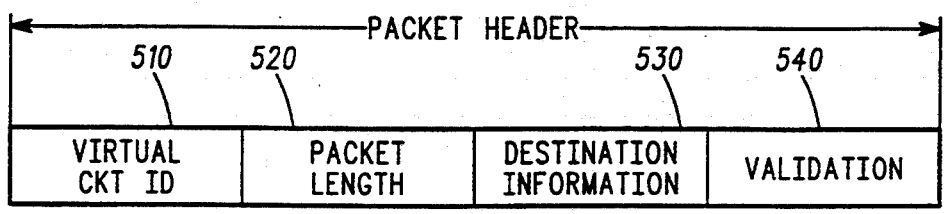
FIG. 5 illustrates information contained in the packet header as shown in FIG. 4.

FIG. 5 illustrates the information contained within the packet header 420 of FIG. 4. It also represents the extent of the control data portion of a transmission packet that does not require reassembly. Each packet header 420 includes a virtual circuit identification (ID) field 510, packet length information field 520, destination information field 530, and validation information field 540. The virtual circuit ID field 510 contains information that specifies a virtual circuit register contained within packet switch 140 of FIG. 2. The virtual circuit register points to or addresses a queue control block which in turn points to read and write packet descriptors which can point to an additional packet descriptor, as well as to read and write buffer descriptors. The buffer descriptors each point to a write buffer and to a next read and write buffer descriptor, thereby forming a chain or link of addresses for defining which buffer location the message data portion of a received transmission packet not requiring reassembly will be stored. For further information on this process, the interested reader is referred to U.S. patent application Ser. No. 07/719,212, filed Jun. 21, 1991 and assigned to the assignee of the present invention.

The packet length field 520 provides information concerning the length of the associated packet. The destination information field 530 includes destination device address information. The validation information field 540 contains data associated with a cyclic redundancy check (CRC) data accuracy calculation.

In accordance with the present invention, the most significant bit (MSB) of the virtual circuit ID field 510 is used to identify a transmission packet requiring reassembly. If the MSB of the virtual circuit ID field 510 of a received transmission packet 310 is a '0', it indicates that the packet does not require reassembly. In accordance, the packet is switched by switch 212 of FIG. 2 to the input function 216 for processing and thereby avoiding the reassembly hardware 214. If, on the other hand, the MSB of the virtual circuit ID field 510 of a received transmission packet 310 is a '1', packet handling control is switched by switch 212 to the packet reassembly hardware 214 of FIG. 2. The lower seven bits of the virtual circuit ID field 510 are used as a reassembly identification (ID). The reassembly ID contains information that specifies a reassembly register contained within the packet switch 140 as described herein below in more detail.

Figure 6:
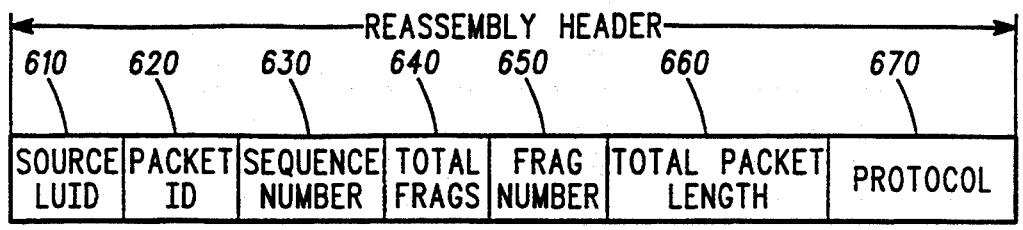
FIG. 6 illustrates information contained in the reassembly header as shown in FIG. 4.

FIG. 6 illustrates information contained within the reassembly header 430 of the transmission packet of FIG. 4. Of note, a reassembly header is only found on those transmission packets that carry a fragment comprising originating device message data. By design it includes a source logical unit identification (LUID) 610, packet identification (ID) field 620, sequence number field 630, total fragment field 640, fragment number field 650, total packet length field 660 and a protocol field 670.

The source LUID 610 defines the logical unit identification of the originating device. The packet ID field 620 and the sequence number field 630, in combination, are used to provide a unique ID for each data packet 300 of FIG. 3. The packet ID field 620 identifies a data packet from a particular originating device from which the received fragment was communicated. The sequence number field 630 is used when a packet ID number is being reused by an originating device in order to associate the reused packet ID with a different data packet 300. The total fragment field 640 defines the total number of fragments comprising the data packet in question. The fragment number 650 defines which of the fragments is being received, while the total packet length field 660 defines the length in bytes of the data packet as reassembled. The protocol field 670 is employed in a manner described herein below to assure the proper receipt of each fragment 310 comprising the data packet 300 in accordance with the present invention.

Figures 9, 10:
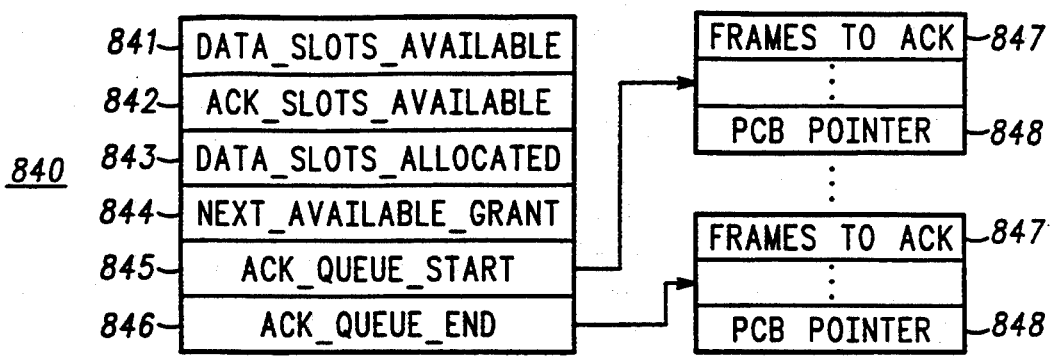
FIG. 9 depicts the structure of a Frame Control Block as shown in FIG. 8.
FIG. 10 shows the format and content of a packet control block as shown in FIG. 8.
Figure 7:
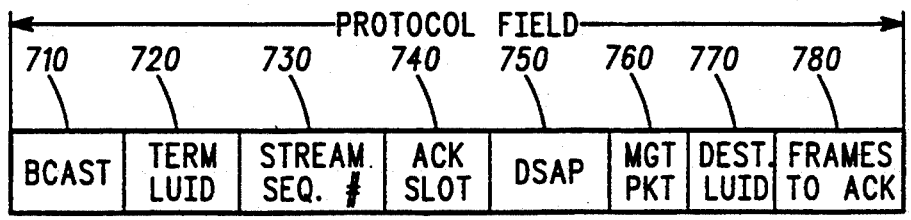
FIG. 7 illustrates information contained in the protocol field of a packet reassembly header as shown in FIG. 6.

FIG. 7 illustrates the information contained in the protocol field of a reassembly packet as shown in FIG. 6 and the PCB as shown in FIG. 9. As depicted, the protocol field comprises broadcast field 710, terminal LUID field 720, data stream sequence number 730, acknowledgment (ACK) slot 740, Destination Service Access Point (DSAP) field 750, management packet field (mgt. pkt) 760, destination LUID field 770, and Frames to acknowledgment (ACK) field 780.

The broadcast field 710 is used in CM to UM transmission. When the received packet is of a broadcast type, the broadcast field will be set to a logic one, otherwise it is a logic zero, identifying a non-broadcast type packet. Broadcast type packets are received and processed by all terminals devices 96 within the zone of coverage as established by CM 92. Non-broadcast type packets, on the other hand, are for receipt by a specifically identified terminal 96 within the CM 92 zone of coverage.

The terminal ID field 720 stores a value assigned by a servicing UM 94 when it receives, for the first time, a data packet from a newly installed terminal device 96. Thereafter, the terminal 96 is identified by this terminal ID.

The stream sequence number field 730 stores a number used by UMs 94 and CM 92 alike, to sequence received data packets thereby preserving their sequential relationship with respect to a common point of origin. It will be appreciated that this field size can be any number of bits, n, necessary to provide functionality. In accordance with the preferred embodiment, the stream sequence number field 730 is a 6 bit field which provides for a range of $2^6$ sequence numbers from 0–63.

The ACK slot 740 is only used to program the acknowledgments from the UM to CM whenever a CM is sending a packet to a UM. The ACK slot field tells the receiving UM which ACK slot to use when acknowledging a packet. The ACK slots are updated whenever a fragment is received so that the sender can determine which fragments need retransmitting and which buffers can be released once the fragments have been received.

The DSAP field 750 indicates whether the received packet is destined for a system service or LAN application. This enables proper routing of each received packet to the correct application for further processing.

The management packet field (mgt. pkt.) 760 is used to indicate whether or not the packet is a Simple Network Management Protocol (SNMP) packet.

The Destination LUID 770 specifies the destination address of the UM. The CM uses the destination LUID to relay the packet to the appropriate destination device.

The Frames to ACK field 780 is used to program UM to CM and CM to UM acknowledgements. This field specifies how many consecutive TDMA frames will contain fragmented packets 310 associated with an original data packet 300. In accordance, it is used by a receiving device to determine how many TDMA frames will be necessary to completely acknowledge the transmitted fragments since only one ACK signal per TDMA frame is available to acknowledge the receipt of previously received fragments associated with the original data packet. For example, for a data packet in which all fragments are transmitted in a single TDMA frame, each fragment will have a '1' in the frames to ACK field. This indicates to the receiving device that only one ACK signal need to be scheduled. For a data packet in which fragments are transmitted during two consecutive TDMA frames, the fragments transmitted in the first frame will contain a '2' in the Frames to ACK field, and the fragments transmitted in the second frame will contain a '1' in the Frames to ACK field. This indicates to the receiving device that two ACK signals need to be scheduled for transmission back to the source, one in each of the following two consecutive TDMA frames. Thus, the number contained in the Frames to ACK field 780 (i.e., 1-N where N is an integer) operates to inform the receiving device that ACK signals must be scheduled for transmission over an identical number of consecutive TDMA frames as specified in the Frames to Ack field.

Figure 8:
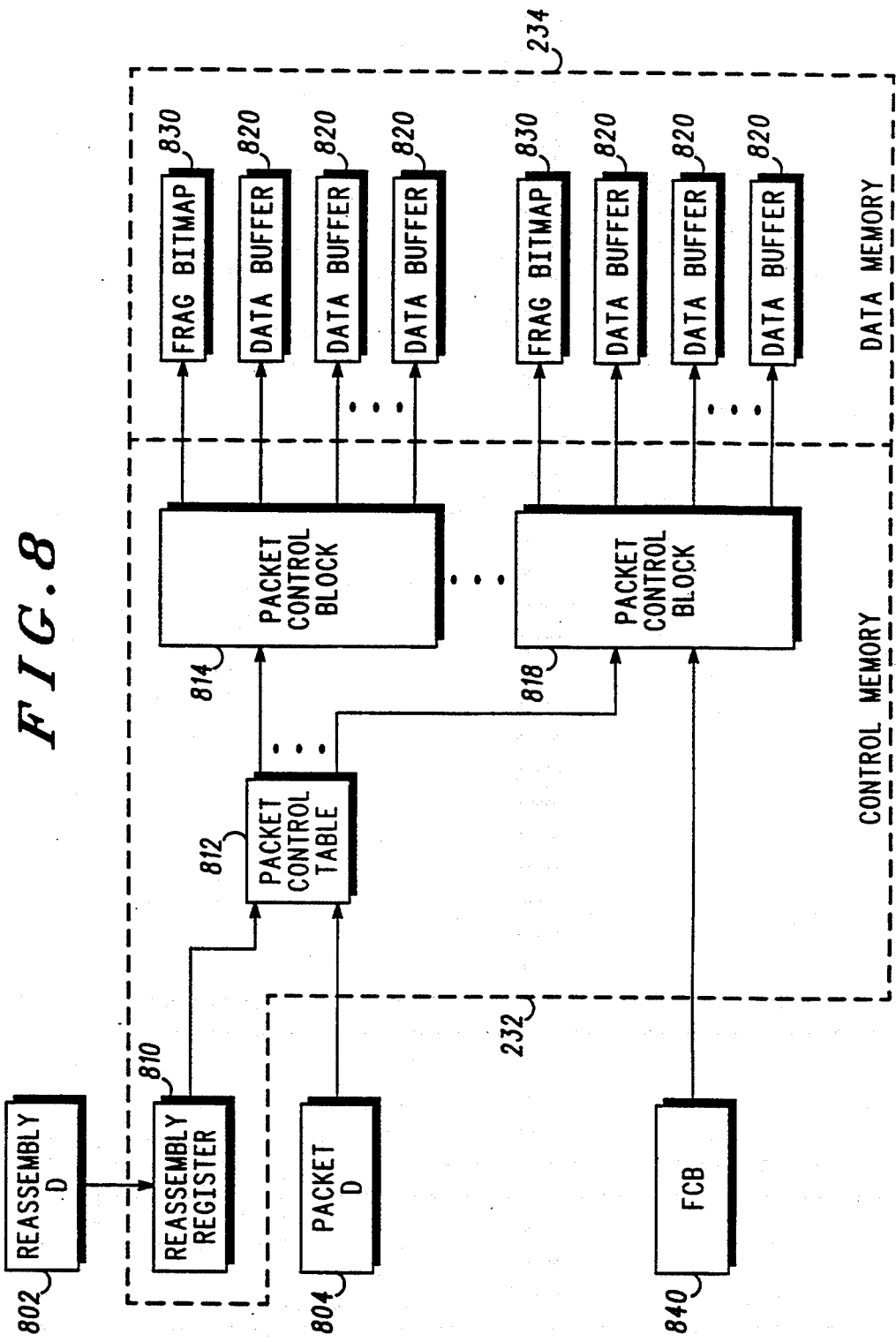
FIG. 8 is a diagram representing the control structure of the packet reassembly hardware of FIG. 2.

FIG. 8 illustrates the organizational structure employed during packet handling in accordance with the present invention. In the illustrative depiction, transmission packet message data, i.e., fragments 312 of FIG. 3 are stored in respective data buffers 820 within data memory 234 as shown in FIG. 8. The corresponding transmission packet control information 311 directs where within data memory 234 the respective fragments 312 will be stored. In particular, the Reassembly Header information as depicted in FIG. 6 directs where within data memory 234 each respective fragment 312 will be stored. In this effort, reassembly ID 802 obtained from the virtual circuit ID 510 as described above in association with FIG. 5, is used to point to one of a plurality of reassembly registers 810 stored in control memory 232. Use of a plurality of reassembly registers 810 permits the reassembly of data packets from multiple originating devices, simultaneously, for each reassembly register 810 corresponds to a unique source device.

As depicted, reassembly register 810 points to or addresses a packet control table 812. In concert with said reassembly register 810, the packet ID 804 of the reassembly header of FIG. 6 operate to address an entry in the packet control table. It should be noted that each reassembly register 810 addresses a unique packet control table 812. This allows multiple data packets from the same originating device to be reassembled simultaneously.

The packet control table 812 points to or addresses a packet control block 814–818 being used for the specified packet ID 820. Since there can be several packet IDs from a single originating device, a single packet control block is provided for each data packet being reassembled. The packet control block is therefore the point where all information concerning data packet reassembly and retransmission is collected on the receive side and all control information is established on the transmit side. Of note, packet control blocks 814–818 are shared resources.

There is a queue of available packet control blocks for storing information regarding a newly received data packet. The packet switch 140 of FIG. 2 takes a packet control block out of this queue when needed. The central processor 110 of FIG. 1 is responsible for returning it back to the queue when the reassembly process is complete.

Each packet control block points to data buffers 820 as well as a fragment bit map 830, each having a separate and distinct memory location (address). The fragment bit map 830 is a map of the fragments that have been successfully received for a specified data packet. Each bit map is updated as additional fragments are received. The data buffers 820 are the locations within data memory 234 where the fragments, message data portions of each received transmission packet, are stored.

An important aspect of this invention is to provide a method for assuring reliable delivery of fragmented packets in a packet data network. In accordance, each receiving device must transmit an acknowledgment (ACK) signal back to the source device which identifies the data packet 300 of concern and which fragments 312 of the data packet in question have or have not been received. Upon receipt of this information, the source device may retransmit any missing information or release those system resources associated with the original data packet if all fragments associated therewith have been received and ACKed by the receiving device.

According to the present invention, the source and receiving devices communicate via well known TDMA communication techniques. According to the preferred embodiment, each data packet, having fragments which are received during a current TDMA frame, will be ACKed during a next following TDMA frame. Frame Control Block (FCB) 840 of FIG. 8 is provided to store that information regarding data packets for which fragments are received during a current frame. This information is stored and employed by the system processor to generate appropriate ACK signals for transmission back to the source device. ACK signals contain status information for each fragment comprising the data packet in question.

FIG. 9 illustrates the structure of the FCB 840 of FIG. 8. As depicted in FIG. 9, FCB 840 may consist of the following fields of information. Data_Slots_Available field 841 contains information on how many data time slots are available for allocation in a current TDMA frame. ACK_Slots Available field 842 contains information on how many data_ack time slots in the following TDMA frame are available for allocation. Data_Slots_Allocated field 843 contains information on how many data time slots in the current TDMA frame have been allocated. Next_Available_Grant field 844 contains identification of the next grant time slot available for transmission of a bandwidth grant. Ack_Queue_Start field 845 identifies the first packet which needs to be ACKed during the next TDMA frame. Ack_Queue End field 846 identifies the last packet which needs to be ACKed during the next TDMA frame.

Each Ack_Queue field 845 and 846 contains various sub-fields for use during ACK generation. In accordance with the preferred embodiment, each Ack_Queue field contains at least a Frames To Ack field 847 and a PCB Pointer field 848. The Frames To Ack sub-field 847 indicates how many frames are required for the ACK to be properly transmitted. The PCB Pointer 848 points to the PCB which holds information regarding the packet to be acknowledged.

In accordance with the present invention an acknowledgment signal is scheduled for transmission by copying the Frames To Ack field 780 of FIG. 7 into the Frames To Ack field 847 of the FCB 840 of FIG. 9. In addition a pointer must be placed from FCB field 848 to the appropriate PCB 814–818 of FIG. 8. Thereafter, at the start of each TDMA frame (Frame Start), the acknowledgment information maintained in the FCB is examined by the system processor 110 of FIG. 1b to format an ACK signal for transmission during the appropriate time within the following TDMA frames. Such an ACK signal is depicted and described herein below in association with FIG. 12. In accordance with the present invention, the PCB information identified by the PCB pointer 848 is copied from the indexed PCB (814–818) into the ACK signal format of FIG. 12. Thereafter the ACK signal is transmitted back to the source device for processing. The frames to ACK field 847 is then examined by the system processor 110 of FIG. 1b to determine whether it contains a '1'. Assuming the frames to ACK field 847 contains a value greater than '1', additional ACK signals must be scheduled. In this effort, the Frames to ACK field 847 is decremented by the system processor 110 of FIG. 1b which then waits for the next Frame Start prior to copying the updated PCB information indexed by pointer 848 into yet another ACK signal. When the last ACK signal has been scheduled for transmission, i.e., when the Frames To Ack field equals 1, no additional ACK signals require transmission. In accordance, system resources associated with the original data packet may be released for additional use. If all fragments associated with the original data packet 300 have been received and acknowledged, the system processor will route the data comprising the original data packet for further processing, otherwise the Next Fragment Interrupt Bit of the Interrupt Control Field of FIG. 11 will be enabled so that the system processor may be interrupted upon receipt of a retransmitted fragment to reschedule appropriate ACK signals as described herein below.

Figure 12:
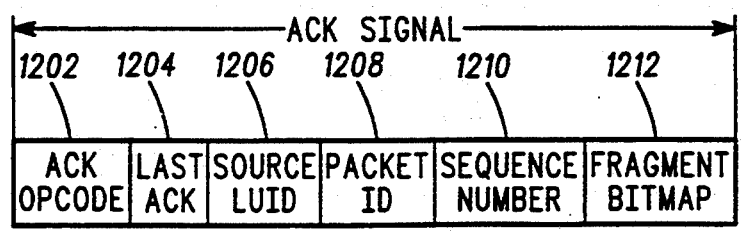
FIG. 12 depicts the format and content of an acknowledgement transmission in accordance with the present invention.

FIG. 12 depicts the format and content of an ACK signal in accordance with the present invention. As shown, each ACK signal 1200 comprises an Opcode field 1202, a last ACK field 1204, Source LUID field 1206, packet ID 1208, Sequence Number field 1210 and ACK Bitmap field 1212. The Opcode field 1202 identifies the transmission as an ACK signal. The Last ACK field 1202 is used to identify the last ACK signal corresponding a particular data packet 300. In accordance, the Last ACK field 1202 is set to a logic 1 when the Frames to Ack field 780 of FIG. 7 is equal to 1. In all other instances, the Last ACK field 1202 is set to a logic 0, indicating additional ACK signals are required in association with the data packet identified by the Source LUID field 1206, packet ID 1208, Sequence Number field 1210 and ACK Bitmap field 1212 copied from the PCB 814–818 of the packet being acknowledged. Of note, the ACK Bitmap field 1212 comprises a status bit for each 0-N fragment comprising an original data packet 300. A logic 1 in bitmap positions 0-N indicates receipt of that fragment. A logic 0 within bitmap positions 0-N indicates a request for retransmission of that fragment.

Upon receipt by the source device said ACK signal 1200 is processed to determine which data fragments 310 comprising the original data packet were correctly received by the receiving device. This determination is made by an examination of the Fragment Bitmap field 1212. Assuming any fragments were correctly received by the receiving device, the source device will release all system resources associated with the correctly received transmissions. If, on the other hand, any fragments are identified as missing or unintelligible and therefore require retransmission, the source device will allocate additional bandwidth resources in order to retransmit the missing information. This determination is typically not made until receipt of an ACK signal wherein the Last ACK field 1204 contains a logic 1 indicating that no further ACK signals are anticipated for this particular data packet.

When the retransmitted fragment arrives at the receiving device, the packet reassembly control structure of FIG. 8 will interrupt the central processor 110 of FIG. 1b in response to the interrupt flag previously enabled within the PCB. Thereafter, the processor 110 will proceed to process the received information to complete reconstruction of the original data packet and in addition to schedule transmission of yet another ACK signal 1200 to acknowledge the retransmitted data.

FIG. 10 illustrates the fields associated with a packet control block 814–818 of FIG. 8. As previously suggested, the packet control block is used to collect all relevant control information for a data packet on the transmit side and control reassembly by storing validated fragments and requesting retransmission of improperly received fragments on the receive side. Accordingly, a packet control block consists of a source LUID field, packet ID field, sequence number field, total fragment number field, fragment received field, packet length field, a protocol field, an interrupt control field, a fragment bit map pointer, a plurality of data fragment pointers, a timer control block pointer, a next PCB pointer, a PCB hold counter, a buffer pool ID, a fragment to program field, a packet delivery window field, a retry count field, a request ID field and an acknowledgment schedule field, in addition to a broadcast antenna count field, a broadcast current antenna field and antenna list field. It will be appreciated by those skilled in the art, that most of the information found in the packet control block is taken directly from the reassembly header of a received transmission packet in accordance with FIG. 6. Of note, this information is taken from the first received transmission packet from within the plurality comprising the data packet, regardless of the first received transmission packers fragment number. Once the control information is stored in the packet control block, only the source LUID for a later received transmission packet is compared to the information residing in the reassembly header. If there is a miscompare, the transmission packet's fragment will not be stored in connection with this packet control block.

As it suggests, the fragment received field is simply a count of the number of fragments successfully received. If duplicate fragments are encountered, they are not added to the count. This field is ultimately compared to the total number of fragments field to determine when the complete data packet has been received.

The received fragment bit map pointer points to a bit map 830 of received fragments. Each bit map 830 is stored in the data memory 234 of FIGS. 2. When a fragment is successfully received, the bit map bit corresponding to that fragment is set to a logic '1'. As previously mentioned, the fragment number found in the reassembly header of FIG. 6, while not stored, is nonetheless used to index into the received fragment bit map. If the bit map is larger than the total number of fragments received, unused bits will remain unchanged. The data fragment pointer fields, numbered 0-M with M equaling the maximum number of fragments allowed, point to data buffers 820 of FIG. 8. There is a single data buffer for each received fragment. Of note, each data buffer is a shared resource.

When the packet reassembly control structure of FIG. 8 determines that it needs a data buffer, it will take a data buffer pointer from a data buffer queue. This pointer will be stored in the packet control block for association with the received fragment. When the data buffer used to store a fragment is no longer in use, the central processor 110 will return it to the data buffer queue. The timer control block pointer points to a structure used to manage a timer for reassembly or packet delivery. The next PCB pointer points to a different reassembly PCB. It is used when the PCB is in the transmit PCB pool, or by the sequencing process when a packet is queued for packet reordering. The PCB hold counter field is used to coordinate the release of a PCB when multiple processes am occurring simultaneously. When a process is completed the PCB hold counter decrements the value of this field. When the last process is finished, the PCB hold counter will decrement this field to zero and release the PCB.

The buffer pool ID identifies whether the buffers attached to the PCB were allocated for receive or transmit over the RF. The next fragment to program field contains the fragment pointer to the next data fragment to be programmed. Once all the fragments have been programmed for initial transmission, this field will be set to indicate the first fragment again. The current state field indicates what state, idle or waiting, for acknowledgment the UM 94 is currently in. The packet delivery window field contains information used to implement a packet delivery time-out for packets being transmitted. The retry field keeps track of how many times the request has been sent to the CM 92 for this packet. It is used to calculate the time out.

The request ID field is used to map incoming grants to outgoing requests The ACK scheduled field is a Boolean field which indicates whether or not an acknowledgment has been scheduled for this incoming packet. The last three fields are used only at the CM 92 for transmitting broadcast packets. The broadcast antenna count is the number of CM antennas which have at least one UM registered to them. The broadcast current antenna is used to indicate which of the CM antennas in the broadcast list is currently being serviced. The broadcast antenna list is an array containing a list of the CM antennas which have at least one UM registered to them.

Since, the present invention is directed to the protocol fields which are strictly used by the central processor 110 of FIG. 1., it should be noted that the packet reassembly control structure of FIG. 8 does not use any of the information within the protocol fields during the reassembly process, it merely stores the information in the appropriate packet control block.

Figure 11:
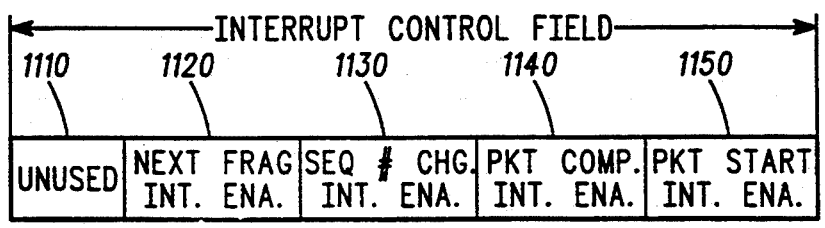
FIG. 11 illustrates information contained in the interrupt control field as shown in FIG. 10 in accordance with the present invention.

FIG. 11 illustrates the information contained in the interrupt control field of the PCB as shown in n FIG. 9. The interrupt control field is used to control central processor interrupts. Examples of common interrupts that the packet reassembly control structure of FIG. 8 can generate are the Next Fragment 1120, Sequence Number Change 1130, Packet Complete 1140, and Packet Start 1150 interrupts. Field 1110 is reserved for future use. As will be appreciated, an interrupt bit in the status section of an interrupt queue entry will be set to indicate which event caused the interrupt. The interrupt control field of the packet control block contains bits to enable and disable each interrupt.

A packet reassembly interrupt queue (not shown) is used by the packet reassembly control structure to interrupt the processor 110 when so commanded by the interrupt control field of the packet control blocks 814–818 in question. Interrupts are initiated by the reassembly hardware placing entries into the interrupt queue. Such entries comprise at least the address of the packet control block 814–818 in question and the interrupt status. Of note, several entries may be handled by the processor during a single interrupt.

By way of example, the Next Fragment interrupt 1120 is generated when the Next Fragment interrupt bit in the packet control block is enabled. This interrupt is used when the retransmission of a fragment is required. In accordance with the present invention, this interrupt informs the processor to schedule transmission of an acknowledgment signal in order to verify receipt of the retransmission of any previously missing information. If the Next Fragment interrupt is enabled, an interrupt will be generated by placing the address of the packet control block and the interrupt status in the packet reassembly interrupt queue.

The Sequence Number Change interrupt 1130 generated when the sequence number in the reassembly header of a received transmission packet having a packet ID is not equal to the sequence number stored in the packet control block associated with the packet ID, all fragments associated with the previous data packet have not been received and the Sequence Number Change interrupt is enabled. When a transmission packet is received, the sequence number in the packet reassembly header is compared to the sequence number stored in the packet control block associated with the packet ID. If the numbers are different and this is not the first fragment received, the Sequence Number Change interrupt bit in the interrupt status is set. If the Sequence Number Change interrupt is enabled, an interrupt will be generated by placing the address of the packet control block for the packet with the former Sequence Number and the interrupt status in the packet reassembly interrupt queue. A change in the Sequence Number will cause the central processor 110 to log the event, stop the reassembly timer and reclaim resources allocated by the hardware releasing the associated PCB and data buffers.

The Packet Complete interrupt 1140 is generated when all fragments of a fragmented data packet are received and the Packet Complete interrupt is enabled. In response the central processor will stop the reassembly timer and direct the retransmission of the reassembled data packet in accordance with the dictates of scheduling acknowledgments as discussed in the aforementioned interrupt process. The receive sequence window is updated after all retransmitted packets have been received. The packet is further processed in accordance to the destination information contained within the data packet. Of note, the last fragment received does not have to be the Nth fragment of a data packet with N fragments. The first time a fragment is received, the fragment received field in the packet control block is incremented. When the fragment received field is equal to the total number of fragments count and if the Packet Complete interrupt is enabled, the Packet Complete interrupt is generated by placing the address of the packet control block and the interrupt status in the packet reassembly interrupt queue.

The Packet Start interrupt 1150 is generated when a fragment of a new data packet is first received, regardless of the fragments fragment number. In return, the system processor will set a reassembly timer within which time all fragments associated with the newly received data packet must be received, else reassembly will be aborted. If the Packet Start interrupt is enabled, an interrupt is generated by placing the address of the packet control block and the interrupt status in the packet reassembly interrupt queue. Of note, the packet reassembly control structure of FIG. 8 will not generate an interrupt until the fragment has been completely received and the packet control block has been updated.

Figure 13:
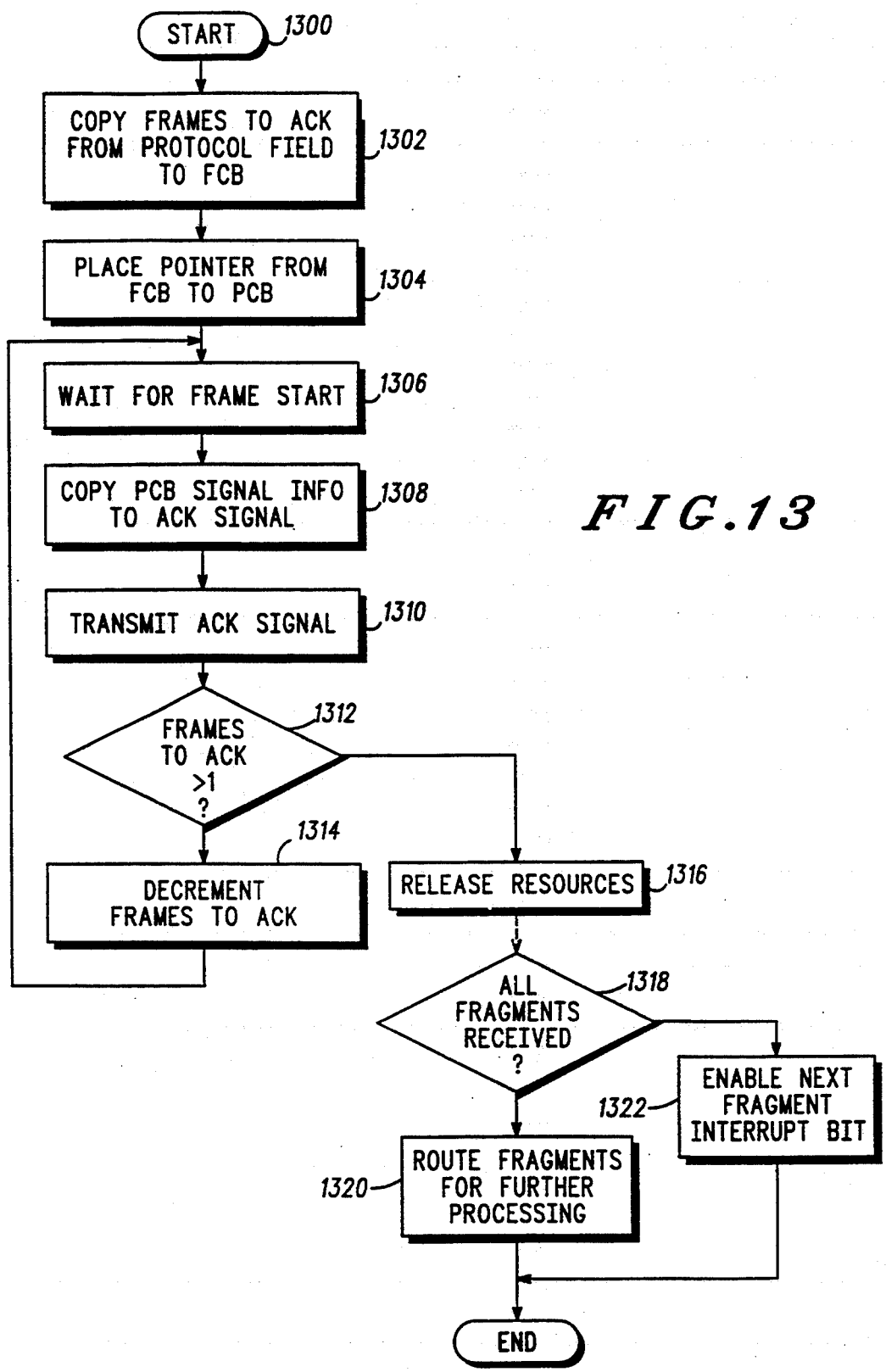
FIG. 13 is a flow chart diagram of the steps performed by the system processor in order to schedule an acknowledgement signal for transmission in accordance with the present invention.

In accordance with the present invention and FIG. 13, a flow chart diagram depicting the steps performed by the system processor 110 in order to schedule the transmission of an ACK signal 1200 is provided. Commencing with start block 1300, flow proceeds to block 1302 where the Frames To Ack field 780 of the protocol field of FIG. 7 is copied into the Frames To Ack field 847 of the FCB 840 of FIG. 9. At block 1304, a pointer is placed from FCB field 848 of FIG. 9 to the appropriate PCB 814–818 associated with the particular data packet in question. Thereafter, at block 1306, system processor 110 awaits the start of a next TDMA frame (i.e., Frame Start). Upon detection of a Frame Start at block 1306, flow proceeds to block 1308 where the acknowledgment information maintained in the FCB is examined by the system processor 110 in order to format an ACK signal 1200 for transmission during the appropriate time within a following TDMA frame. In this effort, the PCB information identified by the PCB pointer 848 is copied from the indexed PCB (814–818) into the ACK signal format of FIG. 12. Thereafter, at block 310, the formatted ACK signal is transmitted back to the source device for processing.

At block 1312, the frames to ACK field 847 is then examined by the system processor to determine whether it contains a value of '1'. Assuming the frames to ACK field 847 contains a value greater than '1', additional ACK signals must be scheduled. In accordance, flow proceeds from block 1312 to block 1314 where the Frames to ACK field 847 is decremented by the system processor 110. From block 1314, flow branches back to block 1306 where the system processor waits for yet another Frame Start indication prior to copying the updated PCB information indexed by pointer 848 into yet another ACK signal.

This process continues until the last ACK signal has been scheduled for transmission, i.e., when the Frames To Ack field equals 1. When no additional ACK signals require transmission as determined by block 1312, all system resources associated with the original data packet may be released for additional use at block 1316.

At block 1318 a check is performed to determine whether all fragments associated with the original data packet 300 have been received and acknowledged. Assuming all fragmented packets were correctly received and acknowledged, the system processor at block 1320 will route the data comprising the original data packet for further processing; otherwise, flow proceeds to block 1322 where a Next Fragment Interrupt Bit of the Interrupt Control Field of FIG. 11 is enabled so that the system processor may be interrupted upon receipt of a retransmitted fragment to reschedule appropriate ACK signals for the retransmitted data in accordance with the steps described in association with FIG. 13.

As previously mentioned, the transmitting device receives and processes each ACK signal. If any data fragments remain unacknowledged, the source device goes through the process of allocating additional bandwidth resources to retransmit those fragments identified as missing. When the retransmitted fragment arrives at the receiving device, the packet reassembly control structure will interrupt the system processor 110 because the Next Fragment interrupt bit was previously enabled. Thereafter, the processor 110 will proceed to process the received information to complete reconstruction of the original data packet as well as schedule the transmission of yet another ACK signal 1200 to acknowledge the retransmitted data.

What is claimed is:

1. In a packet switching system, a packet switch for acknowledging receipt of a plurality of packet fragments associated with a fragmented data packet, said packet switch comprising:

a transceiver for transmitting acknowledgment signals and receiving said plurality of packet fragments, each packet fragment comprising address, control and data information associated with the fragmented data packet;

said packet switch, coupled to the transceiver and comprising memory logic, for acknowledging, via acknowledgment signal, reception of said packet fragments and determining whether all packet fragments comprising the fragmented data packet have been received;

means, coupled to the memory logic, for enabling a system processor interrupt signal when all packet fragments comprising the fragmented data packet have not been received;

means, coupled to the enabling means, for interrupting a system processing resource via said interrupt signal upon receipt of a retransmitted packet fragment; and means, coupled to the system processing resource, for scheduling transmission of an acknowledgment signal of the retransmitted packet fragment.

2. In a packet switching system having a packet switch, a method for acknowledging receipt of a plurality of packet fragments associated with a plurality of fragmented data packets, from a source, said method comprising the steps of:

receiving, at said packet switch, a plurality of packet fragments, each packet fragment comprising address, control and data information associated with one of the plurality of fragmented data packets;

said packet switch, acknowledging the reception of each packet fragment and determining whether all packet fragments associated with the received packet fragment and comprising one of the plurality of fragmented data packets have been received;

said packet switch, enabling a system processor interrupt bit when all packet fragments associated with the received packet fragment and comprising one of the plurality of fragmented data packets have not been received;

said source, upon receipt of an acknowledgment, scheduling retransmission of unreceived packet fragments;

said packet switch, interrupting system processing resources via an interrupt signal upon receipt, at said packet switch, of a retransmitted packet fragment;

said system processing resource, scheduling transmission of an acknowledgment signal for delivery to the source to acknowledge receipt of the retransmitted packet fragment.

3. The method of claim 2 further comprising the steps of:

assigning a respective data buffer to each received packet fragment;

storing a data portion of each received packet fragment in the assigned and respective data buffer; and storing a pointer to each respective data buffer in a control memory structure.

4. The method of claim 2 further comprising the step of copying at least a portion of a received packet fragment's control information into memory for identifying a number of TDMA frames required to transmit an acknowledgment for packet fragments comprising the fragmented data packet.

5. In a packet switching system having a packet switch, a method for acknowledging the receipt of packet fragments from a source and associated with a fragmented data packet, said method comprising the steps of:

receiving, at said packet switch, a plurality of packet fragments comprising address, control and data information associated with the fragmented data packet;

copying at least some of the control information into a memory logic structure;

copying at least some of the stored control information into an acknowledgment signal;

transmitting the acknowledgment signal to the source for processing;

determining whether additional acknowledgment signals are required to acknowledge additional packet fragments comprising the fragmented data packet;

determining whether all packet fragments comprising the fragmented data packet have been properly received;

processing the data portion of all packet fragments associated with an original fragmented data packet when all packet fragments comprising the fragmented data packet have been properly received; and enabling a system processor interrupt bit to permit processing of retransmitted packet fragments when all packet fragments comprising the fragmented data packet were not properly received.

* * * * *